(12) United States Patent
Izuha

(10) Patent No.: US 7,983,899 B2
(45) Date of Patent: Jul. 19, 2011

(54) APPARATUS FOR AND METHOD OF ANALYZING CHINESE

(75) Inventor: Tatsuya Izuha, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 83 days.

(21) Appl. No.: 11/008,253

(22) Filed: Dec. 10, 2004

(65) Prior Publication Data

US 2005/0154579 A1   Jul. 14, 2005

(30) Foreign Application Priority Data

Dec. 10, 2003   (JP) ................................. 2003-412308

(51) Int. Cl.
*G06F 17/20*   (2006.01)
*G06F 17/28*   (2006.01)
*G06F 17/21*   (2006.01)

(52) U.S. Cl. .............. 704/9; 704/1; 704/2; 704/7; 704/8
(58) Field of Classification Search ................. 704/9, 8, 704/1, 2, 7
See application file for complete search history.

(56) References Cited

U.S. PATENT DOCUMENTS

| | | | | |
|---|---|---|---|---|
| 5,590,039 | A * | 12/1996 | Ikeda et al. ...................... | 704/9 |
| 5,625,553 | A * | 4/1997 | Kutsumi et al. .................. | 704/2 |
| 5,761,631 | A * | 6/1998 | Nasukawa ........................ | 704/9 |
| 5,873,055 | A * | 2/1999 | Okunishi .......................... | 704/2 |
| 6,332,118 | B1 * | 12/2001 | Yamabana ........................ | 704/9 |
| 6,640,006 | B2 * | 10/2003 | Wu et al. .......................... | 704/9 |
| 6,937,975 | B1 * | 8/2005 | Elworthy ...................... | 382/177 |
| 2001/0029443 | A1 * | 10/2001 | Miyahira ......................... | 704/9 |
| 2005/0086047 | A1 * | 4/2005 | Uchimoto et al. ............... | 704/2 |
| 2005/0137853 | A1 * | 6/2005 | Appleby .......................... | 704/7 |

FOREIGN PATENT DOCUMENTS

JP   7-56926   3/1995

OTHER PUBLICATIONS

Gang, Weng, et al. A Fast algorithm for detection of Chinese lihe words. Nov. 2000. ACM Press. pp. 209-210.*
F. Lixin et al., "A Process Method of Chinese 'LIHECI' in Chinese-Japanese Machine Translation," IPSJ Journal (Sep. 1994), 35:1702-13.

* cited by examiner

*Primary Examiner* — James S Wozniak
*Assistant Examiner* — Paras Shah
(74) *Attorney, Agent, or Firm* — Finnegan, Henderson, Farabow, Garrett & Dunner, L.L.P.

(57) ABSTRACT

An apparatus for analyzing Chinese according to one aspect of the present invention includes a dependency structure analyzer analyzing a dependency relationship between words by extracting a parent word being a dependency destination of each of the words and a child word being a dependent from each of the words. The words are obtained by dividing a Chinese sentence. The apparatus also includes a lihe-word processor referring to lihe-word information that includes a first word and capable of being a part of a lihe-word and a second word forming the lihe-word with the first word. The lihe-word processor detects the first word and the second word from the words analyzed, and then changes a dependency destination of a word depending on both the first word and the second word to the lihe-word formed by combining the first word with the second word.

16 Claims, 14 Drawing Sheets

FIG.4

| WORD | PART OF SPEECH | LIHE-WORD LIST |
|------|----------------|----------------|
| 今天 | TEMPORAL WORD | |
| 昨天 | TEMPORAL WORD | |
| 我 | PRONOUN | |
| 你 | PRONOUN | C12　　　C13　　　C14 |
| 散 | VERB | 步：NOUN, 会：NOUN, 场：NOUN, |
| 散步 | VERB | |
| 长 | ADJECTIVE | |
| 了 | PARTICLE | |
| 多 | ADVERB | |
| 步 | NOUN | |
| 时间 | NOUN | |
| ? | PUNCTUATION | |
| ... | ... | ... |

(C11 points to 散 row; C15 points to 散步 row; 111 labels the table)

FIG.5

| | |
|---|---|
| C16 → | 散步 |
| C17 → | 散会 |
| C18 → | 散场 |

FIG.6

| | |
|---|---|
| C20 → | 今天你散了多长时间步？ |
| C21 → | 今天 |
| C22 → | 你 |
| C23 → | 散 |
| C24 → | 了 |
| C25 → | 多 |
| C26 → | 长 |
| C27 → | 时间 |
| C28 → | 步 |
| C29 → | ? |

FIG.7

| ID | WORD | PART OF SPEECH | STARTING POINT | LENGTH | PARENT NODE | CHILD NODE | LIHE-WORD LIST |
|---|---|---|---|---|---|---|---|
| 0 | 今天 | TEMPORAL WORD | 0 | 2 | | | |
| 1 | 你 | PRONOUN | 2 | 1 | | | |
| 2 | 散 | VERB | 3 | 1 | | | 步 : NOUN, 会 : NOUN, 场 : NOUN |
| 3 | 了 | PARTICLE | 4 | 1 | | | |
| 4 | 多 | ADVERB | 5 | 1 | | | |
| 5 | 长 | ADJECTIVE | 6 | 1 | | | |
| 6 | 时间 | NOUN | 7 | 2 | | | |
| 7 | 步 | NOUN | 9 | 1 | | | |
| 8 | ? | PUNCTUATION | 10 | 1 | | | |

FIG.8

| ID | WORD | PART OF SPEECH | STARTING POINT | LENGTH | PARENT NODE | CHILD NODE | LIHE-WORD LIST |
|---|---|---|---|---|---|---|---|
| 0 | 今天 | TEMPORAL WORD | 0 | 2 | 2 : tmp | | |
| 1 | 你 | PRONOUN | 2 | 1 | 2 : subj | | |
| 2 | 散 | VERB | 3 | 1 | -1 | 0,1,3,7,8 | 步 : NOUN, 会 : NOUN, 场 : NOUN |
| 3 | 了 | PARTICLE | 4 | 1 | 2 : as | | |
| 4 | 多 | ADVERB | 5 | 1 | 5 : adv | | |
| 5 | 长 | ADJECTIVE | 6 | 1 | 6 : adj | 4 | |
| 6 | 时间 | NOUN | 7 | 2 | 7 : adjn | 5 | |
| 7 | 步 | NOUN | 9 | 1 | 2 : obj | 6 | |
| 8 | ? | PUNCTUATION | 10 | 1 | 2 : pu | | |

FIG.11

| ID | WORD | PART OF SPEECH | STARTING POINT | LENGTH | PARENT NODE | CHILD NODE | LIHE-WORD LIST |
|---|---|---|---|---|---|---|---|
| 0 | 今天 | TEMPORAL WORD | 0 | 2 | 2 : tmp | | |
| 1 | 你 | PRONOUN | 2 | 1 | 2 : subj | | |
| 2 | 散 | VERB | 3 | 1 | - | 0,1,3, 7,8 | 步 : NOUN, 会 : NOUN, 场 : NOUN |
| 3 | 了 | PARTICLE | 4 | 1 | 2 : as | | |
| 4 | 多 | ADVERB | 5 | 1 | 5 : adv | | |
| 5 | 长 | ADJECTIVE | 6 | 1 | 6 : adj | 4 | |
| 6 | 时间 | NOUN | 7 | 2 | 7 : adjn | 6 | |
| 7 | 步 | NOUN | 9 | 1 | 2 : obj | 6 | |
| 8 | ? | PUNCTUA-TION | 10 | 1 | 2 : pu | | |
| 9 | 散步 | VERB | | | -1 | | |

121

C32 (row 2), C33 (row 7), C34 (row 9)

FIG.13

| | ID | WORD | PART OF SPEECH | STARTING POINT | LENGTH | PARENT NODE | CHILD NODE | LIHE-WORD LIST |
|---|---|---|---|---|---|---|---|---|
| C35 | 0 | 今天 | TEMPORAL WORD | 0 | 2 | 9 : tmp | | |
| C36 | 1 | 你 | PRONOUN | 2 | 1 | 9 : subj | | |
| C32 | 2 | 散 | VERB | 3 | 1 | - | 7 | 步 : NOUN, 会 : NOUN, 场 : NOUN |
| C37 | 3 | 了 | PARTICLE | 4 | 1 | 9 : as | | |
| | 4 | 多 | ADVERB | 5 | 1 | 5 : adv | | |
| | 5 | 长 | ADJECTIVE | 6 | 1 | 6 : adj | 4 | |
| | 6 | 时间 | NOUN | 7 | 2 | 7 : adjn | 5 | |
| C39 | 7 | 步 | NOUN | 9 | 1 | 2 : obj | 6 | |
| C38 | 8 | ? | PUNCTUATION | 10 | 1 | 9 : pu | | |
| C34 | 9 | 散步 | VERB | | | -1 | 0,1,3,8 | |

FIG.15

| | ID | WORD | PART OF SPEECH | STARTING POINT | LENGTH | PARENT NODE | CHILD NODE | LIHE-WORD LIST |
|---|---|---|---|---|---|---|---|---|
| C35 | 0 | 今天 | TEMPORAL WORD | 0 | 2 | 9 : tmp | | |
| C36 | 1 | 你 | PRONOUN | 2 | 1 | 9 : subj | | |
| C32 | 2 | 散 | VERB | 3 | 1 | - | 7 | 步 : NOUN, 会 : NOUN, 场 : NOUN |
| C37 | 3 | 了 | PARTICLE | 4 | 1 | 9 : as | | |
| | 4 | 多 | ADVERB | 5 | 1 | 5 : adv | | |
| C40 | 5 | 长 | ADJECTIVE | 6 | 1 | 6 : adj | 4 | |
| C39 | 6 | 时间 | NOUN | 7 | 2 | 7 : adjn | 5 | |
| C38 | 7 | 步 | NOUN | 9 | 1 | 2 : obj | 6 | |
| C34 | 8 | ? | PUNCTUATION | 10 | 1 | 9 : pu | | |
| | 9 | 散步 | VERB | | | -1 | 0,1,3,8 | |

121

APPARATUS FOR AND METHOD OF ANALYZING CHINESE

CROSS-REFERENCE TO RELATED APPLICATIONS

This application is based upon and claims the benefit of priority from the prior Japanese Patent Application No. 2003-412308 filed on Dec. 10, 2003 the entire contents of which are incorporated herein by reference.

BACKGROUND OF THE INVENTION

1) Field of the Invention

The present invention relates to a system for and a method of analyzing the dependency structure of each word after performing a word dividing process on a Chinese sentence, and a computer program product performing the method.

2) Description of the Related Art

In a machine translation process from the Chinese language into another language (the Japanese language, for example), an input Chinese sentence is divided into words through morphological analysis, and the dependency destination and the dependent(s) or each of the words is analyzed.

Many Chinese words are made up of two characters. Among those two-character words, there are words that have only a weak link between the morphemes. Another component (an insertion component) can be inserted between the morphemes of each of the two-character words. Such a word that can link morphemes or have an insertion component between the morphemes is called a lihe-word.

In the list shown in FIG. 1, for example, a word C1 is a Chinese verb meaning "to take a walk". To form a phrase "to take a walk for a while", a modifier is inserted between a word C3 and a word C4, as shown by a phrase C2. In this case, each of the words C3 and C4 is an independent word. However, a combination of the words C3 and C4 does not have the meaning "to take a walk". Therefore, in the phrase C2, the word C1 should be regarded as one word.

The existence of those lihe-words makes the Chinese analyzing process difficult in performing the Chinese machine translation. To counter this problem, insertion words that can be inserted between the head element and the last element of each lihe-word are listed in advance. A dictionary is then referred to in a morpheme analysis that is carried out for an input Chinese sentence, and each morpheme is determined whether to form a lihe-word. In case of a morpheme that forms a lihe-word, processing such as a dependency structure analysis and a meaning analysis is performed in this order, with each word unit being a word containing two or more characters (see "Lihe-word Processing in Chinese-to-Japanese Machine Translation" IPSJ Journal, Vol. 35, No. 9).

However, there are various kinds of insertion words that can be inserted between the head element and the last element of a lihe-word in the Chinese sentence. Therefore, it is very difficult to list all the insertion words in advance.

Even if all the insertion words can be listed, the number of them is so large that it becomes complicated to search the list of the insertion words for a desired insertion word in the morpheme analyzing process.

SUMMARY OF THE INVENTION

It is an object of the present invention to at least solve the problems in the conventional technology.

An apparatus for analyzing Chinese according to one aspect of the present invention includes a dependency structure analyzer analyzing a dependency relationship between words by extracting a parent word being a dependency destination of each of the words and a child word being a dependent from each of the words. The words are obtained by dividing a Chinese sentence. The apparatus also includes a lihe-word processor referring to lihe-word information that includes a first word being a Chinese morpheme and capable of being a part of a lihe-word and a second word forming the lihe-word with the first word. The lihe-word processor detects the first word and the second word from the words analyzed, and then changes a dependency destination of a word depending on both the first word and the second word to the lihe-word formed by combining the first word with the second word.

A method of analyzing Chinese according to another aspect of the present invention includes analyzing a dependency relationship between words by extracting a parent word being a dependency destination of each of the words and a child word being a dependent from each of the words. The words are obtained by dividing a Chinese sentence. The method also includes referring to lihe-word information that includes a first word being a Chinese morpheme and capable of being a part of a lihe-word and a second word forming the lihe-word with the first word; detecting the first word and the second word from the words analyzed; and changing a dependency destination of a word depending on both the first word and the second word to the lihe-word formed by combining the first word with the second word.

The computer program product according to still another aspect of the present invention causes a computer to perform the method according to the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is an example structure of the Chinese dictionary file shown in FIG. 2;

FIG. 5 is another example structure of the Chinese dictionary file;

FIG. 6 is a Chinese sentence containing a lihe-word;

FIG. 7 is an example structure of the Chinese analysis table shown in FIG. 2;

FIG. 8 is the state of the Chinese analysis table immediately after the dependency structure analyzing process of step S204 of FIG. 3;

FIG. 11 is the state of the Chinese analysis table immediately after the procedures up to step S707 of FIG. 10 are completed;

FIG. 13 is the state of the Chinese analysis table immediately after the procedures up to steps S711 of FIG. 10 are completed;

FIG. 15 is the state of the Chinese analysis table immediately after the procedures up to step S712 of FIG. 10 are completed.

DETAILED DESCRIPTION

Exemplary embodiments of a Chinese analyzing apparatus and a Chinese analyzing method, and a computer program product using the method relating to the present invention will be explained in detail below with reference to the accompanying drawings.

The Chinese analyzing apparatus according to the present invention, the Chinese analyzing method according to the present invention, and the computer program product using the method can be applied to a translation apparatus for translating the Chinese language into another language, a method of translating the Chinese language into another language, and a program for translating the Chinese language into another language. In the following, a Chinese-to-Japanese machine translation apparatus for translating Chinese into Japanese, a Chinese-to-Japanese machine translation method, and a Chinese-to-Japanese machine translation program are described as an embodiment of the present invention. Other than the machine translation apparatus, the machine translation method, and the machine translation program, the present invention can be applied to any kind of system, method, and program, as long as a syntax analysis is carried out after a morpheme analysis is carried out on a Chinese sentence.

In the Chinese-to-Japanese machine translation apparatus, the Chinese-to-Japanese machine translation method, and the Chinese-to-Japanese machine translation program of this embodiment, a Chinese sentence is first input machine translation is then performed on the input Chinese sentence to generate a Japanese sentence, and the generated Japanese sentence is output.

Figure 1:
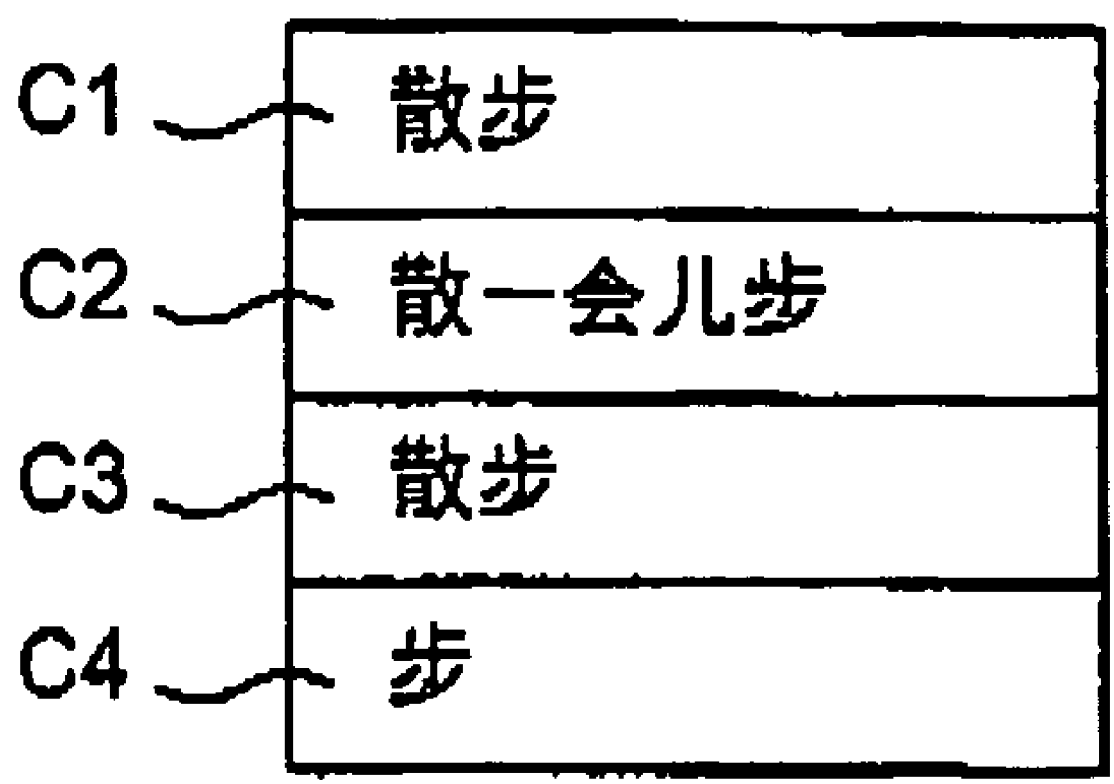
FIG. 1 is a list of Chinese words including a lihe-word.
Figure 2:
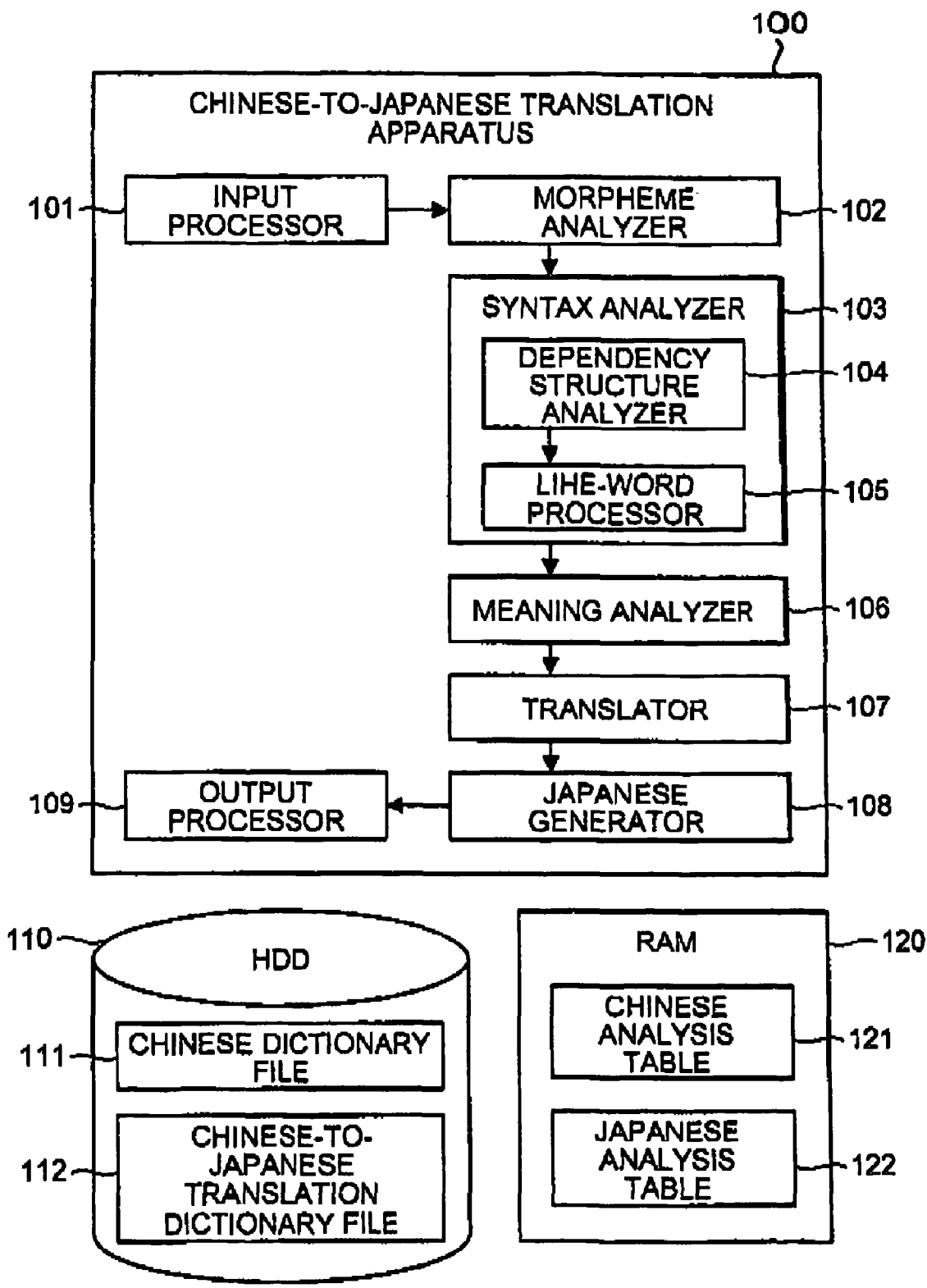
FIG. 2 is a block diagram of the structure of a Chinese analyzing apparatus according to the present invention.

FIG. 2 is a block diagram that depicts the structure of the Chinese analyzing apparatus according to the embodiment of the present invention. As shown in FIG. 2, a Chinese-to-Japanese translation apparatus 100 of this embodiment includes an input processor 101, a morpheme analyzer 102, a syntax analyzer 103, a meaning analyzer 106, a translator 107, a Japanese generator 108, and an output processor 109.

The input processor 101 receives Chinese sentence input from an input device such as a keyboard. The morpheme analyzer 102 performs a known morpheme analyzing process on the input Chinese sentence, to divide the sentence into words. Although the input Chinese sentence is divided into words through morphological analysis in this embodiment, it may be divided into words through another analyzing process.

The syntax analyzer 103 analyzes the dependency structure of each Chinese sentence that is input according to the grammatical rules (restrictions) and various preference rules. In this embodiment, the dependency relationship with respect to lihe-words is changed. The syntax analyzer 103 includes a dependency structure analyzer 104 and a lihe-word processor 105.

The dependency structure analyzer 104 analyzes the dependency relationship among the divided words, to determine how the divided words depend on one another. More specifically, the dependency structure analyzer 104 determines which word depends on which and is depended on by which, and registers each analyzed word in a Chinese analysis table 121.

The lihe-word processor 105 determines whether each divided word is a head element word or a last element word that forms a lihe-word. If the divided word is determined to be part of a lihe-word, the lihe-word processor 105 combines the head element word and the last element word to form the lihe-word. The lihe-word processor 105 then searches a Chinese dictionary file 111 for the combined word, and replaces each of the dependency destinations of the words depending on the head element word and the last element word with the lihe-word.

The meaning analyzer 106 analyzes the meaning and contents of each Chinese sentence that has the dependency structure already analyzed. The translator 107 refers to a Chinese-to-Japanese translation dictionary file 112, and then translates the dependency structure of the Chinese sentence into the dependency structure of an equivalent Japanese sentence. The Japanese generator 108 generates a Japanese sentence from the dependency structure of the equivalent Japanese sentence translated by the translator 107. The output processor 109 outputs the Japanese sentence generated by be Japanese generator 108 to an output device such as a display device or a printer.

The Chinese dictionary file 111 and the Chinese-to-Japanese translation dictionary file 112 are stored in a hard disk drive (HDD) 110. The Chinese analysis table 121 created by the morpheme analyzer 102, and a Japanese analysis table 122 created by the translator 107 are stored in a Random Access Memory (RAM) 120. Although the Chinese analysis table 121 and the Japanese analysis table 122 are created on the RAM 120, both of the tables 121 and 122 may be created on the HDD 110.

The Chinese-to-Japanese machine translation apparatus of this embodiment includes a control device such as a CPU, memory devices such as a ROM (Read Only Memory) and the RAM 120, the HDD 110, an external memory device such as a CD drive, a display device, and input devices such as a keyboard and a mouse. This Chinese-to-Japanese machine translation apparatus is a hardware structure that uses a normal computer.

A Chinese-to-Japanese machine translation program to be executed by the Chinese-to-Japanese machine translation apparatus of this embodiment is recorded in a file of an installable format or an executable format on a computer-readable recording medium such as a CD-ROM, a flexible disk (FD), a CD-R, or a Digital Versatile Disk (DVD).

Alternatively, the Chinese-to-Japanese machine translation program to be executed by the Chinese-to-Japanese machine translation apparatus of this embodiment may be stored in a computer that is connected to a network such as the Internet, and be downloaded via the network. The Chinese-to-Japanese machine translation program to be executed by the Chinese-to-Japanese machine translation apparatus of this embodiment may also be provided or distributed via a network such as the Internet.

The Chinese-to-Japanese machine translation program to be executed by the Chinese-to-Japanese machine translation apparatus of this embodiment is formed by modules that embody the functions of the above described components (the input processor 101, the morpheme analyzer 102, the syntax analyzer 103, the meaning analyzer 106, the translator 107, the Japanese generator 108, and the output processor 109). More specifically, each of the above components is constructed in the main storage by the CPU (a processor) reading out an executing the Chinese-to-Japanese machine translation program from the above described recording medium.

Figure 3:
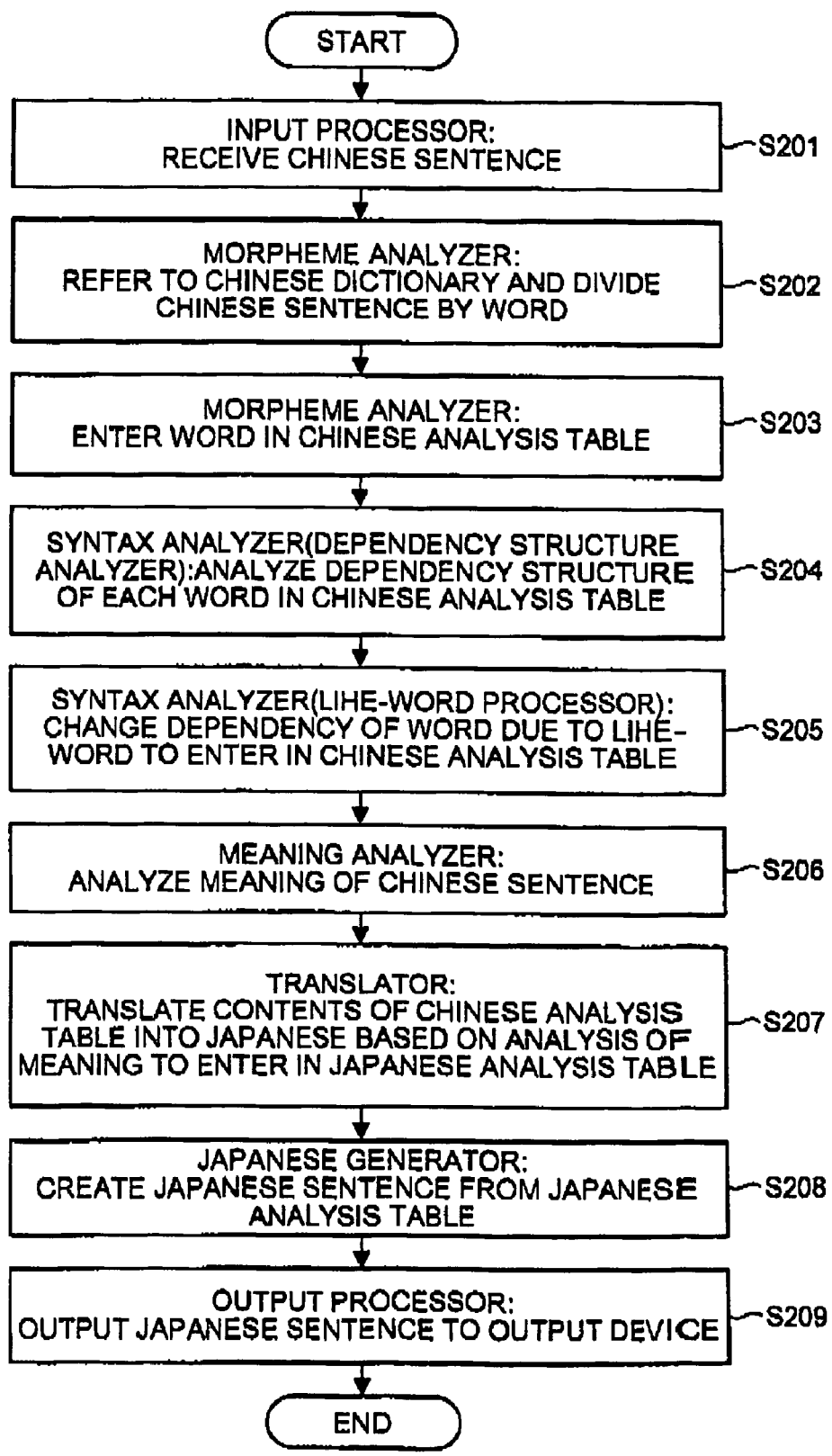
FIG. 3 is a flowchart of the entire operation of Chinese-to-Japanese machine translation according to the present invention.

The Chinese-to-Japanese machine translation to be performed by the Chinese-to-Japanese machine translation apparatus of this embodiment having the above described structure is described in detail. FIG. 3 is a flowchart of the Chinese-to-Japanese machine translation.

When a Chinese sentence is input through an input device, the input processor 101 first receives the Chinese sentence (step S201). Referring to the Chinese dictionary file 111, the morpheme analyzer 102 divides the input Chinese sentence into words (step S202).

FIG. 4 is an example of the contents of the Chinese dictionary file 111. As shown in FIG. 4, "words", "parts of speech", and a "lihe-word list" of words are registered in the Chinese dictionary file 111. The lihe-word list is words that can form lihe-words with the "words", and the parts of speech of the words. For example, a word C11 that is a verb shown in FIG. 4 can form lihe-words C1, C17, and C18 shown in FIG. 5, when combined with words C12, C13, and C14, respectively. The words that do not have any word registered in the column of the "lihe-word list" do not form lihe-words with other words. In FIG. 4, the word C16 that is a lihe-word shown in FIG. 5 is registered as a word C15 in the Chinese dictionary file 111.

As an example Chinese sentence, a Chinese sentence C20 shown in FIG. 6 is described. The Chinese sentence C20 means "How long did you walk (take a walk) today?" The Chinese sentence C20 can be divided into a word C21 (a temporal word), a word C22 (a pronoun), a word C23 (a verb), a word C24 (a particle), a word C25 (an adverb), a word C26 (an adjective), a word C27 (a noun), a word C28 (a noun), and a symbol C29 "?" (punctuation).

After the input Chinese sentence is divided into words at step S202, the morpheme analyzer 102 creates Me Chinese analysis table 121 on the RAM 120, and registers the words obtained by dividing the Chinese sentence at step S202 in the Chinese analysis table 121 (step S203).

FIG. 7 is an example of the Chinese analysis table 121. As shown in FIG. 7, the Chinese analysis table 121 includes the "node ID" that indicates the identification number of the node of each word, the "character(s)" of each word, the "part of speech" of each word, the "staring point" of the position of each word in the sentence, the "length" of each word, the "parent node" indicating the node ID of the dependency destination and the dependency label of each word, the "child node" indicating the node ID(s) of the dependent(s) of each word, and the "lihe-word list" that depicts words that can form lihe-words with the subject word and their parts of speech where the subject word can form lihe-words with other words. FIG. 7 is the state of registration immediately after the procedure of step S203 is completed. At this point, node IDs, characters, parts of speech, starting points, lengths, and a lihe-word list are registered. Here, the lihe-word list already registered in the Chinese dictionary file 111 is simply duplicated.

The dependency structure analyzer 104 performs a dependency structure analysis on the input Chinese sentence, and registers the dependency relationship with respect to each word as analysis results in the Chinese analysis table 121 (step S204). More specifically, the node ID of the dependency destination of each word is registered in the column of "parent node", and the node IDs of all the dependents of each word are registered in the column of "child node". The dependency structure of a Chinese sentence is determined through a dependency structure analysis in this embodiment, but it is also possible to employ some other technique to determine the dependency structure. For example, a phrase structure analyzing technique that is often employed in machine translation for the English language or the like may be applied to Chinese sentences to perform a phrase structure analysis on each Chinese sentence and to convert the analysis result into a dependency structure.

FIG. 8 is the state of the Chinese analysis table 121 immediately after the dependency structure analysis of step S204 is carried out. As shown in FIG. 8, the Chinese analysis table 121 has the node ID of the dependency destination and the dependency label of each word linked to each other with a colon ":". Also, the Chinese analysis table 121 shown in FIG. 8 has the node ID of the dependent of each word registered in the column of "child node".

For example, the dependency destination of a word C31 with a node ID "0" is a word C32 with a node ID "2", and the dependency label of the word C31 is "tmp". The node ID "−1" of the "parent node" column indicates that the corresponding word is of the top level node in the input Chinese sentence. In this example sentence, the word C32 with the node ID "2" is of the top level node. In the column of "child node", the node ID(s) of the dependent(s) are shown. If there are two or more node IDs registered in the column of "child node", with a comma "," being interposed between each two node IDs, the node has two or more dependents. If there is not a node ID registered in the column of "child rode", the word does not have a dependent.

Figure 9:
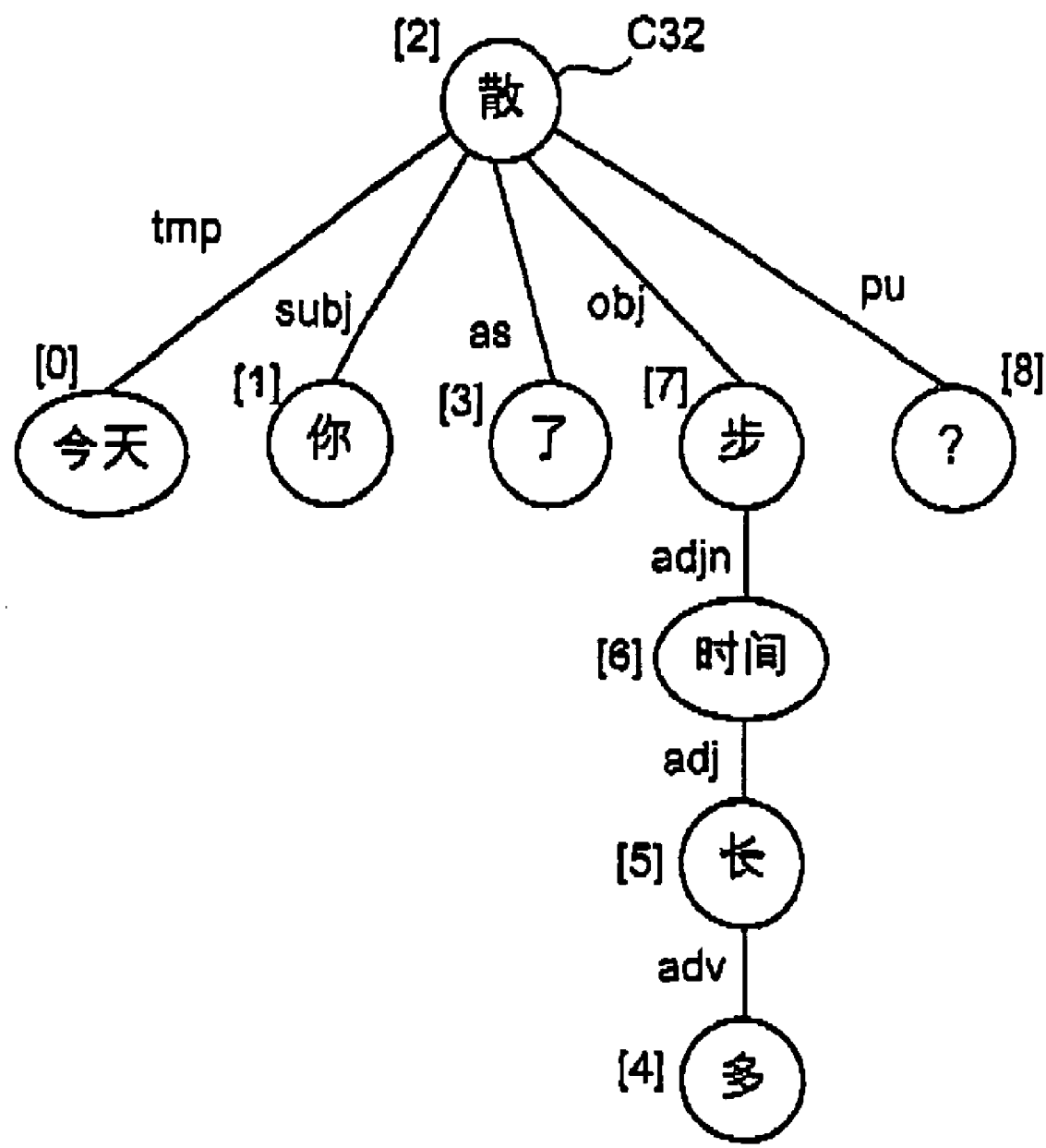
FIG. 9 is a tree structure representative of the dependency structure according to the Chinese analysis table of FIG. 7.

FIG. 9 is a tree structure that depicts the dependency structure according to the Chinese analysis table 121 of FIG. 8. In FIG. 9, the word C32 is of the top level node in the input Chinese sentence.

After the dependency structure analysis on the Chinese sentence is completed at step S204, the lihe-word processor 105, when detecting a lihe-word, makes a change to the dependency relationship among words, and registers the changed dependency relationship in the Chinese analysis table 121 (step S205). The lihe-word processing is described later in greater detail.

The meaning analyzer 106 then analyzes the meaning and contents of the Chinese sentence, the dependency structure of which has already been determined (step S206). Referring to the Chinese-to-Japanese translation dictionary file 112 in the HDD 110, the translator 107 translates the dependency structure of the Chinese sentence into the dependency structure of an equivalent Japanese sentence, and registers the translation result in the Japanese analysis table 122 created in the RAM 120 (step S207). The Japanese generator 108 then generates a Japanese sentence from the dependency structure of the equivalent Japanese sentence translated by the translator 107 (step S208). The output processor 109 then outputs the Japanese sentence generated by the Japanese generator 108 onto an output device such as a display device or a printer (step S209). The machine translation from a Chinese sentence into a Japanese sentence is performed in the above described manner.

Figure 10:
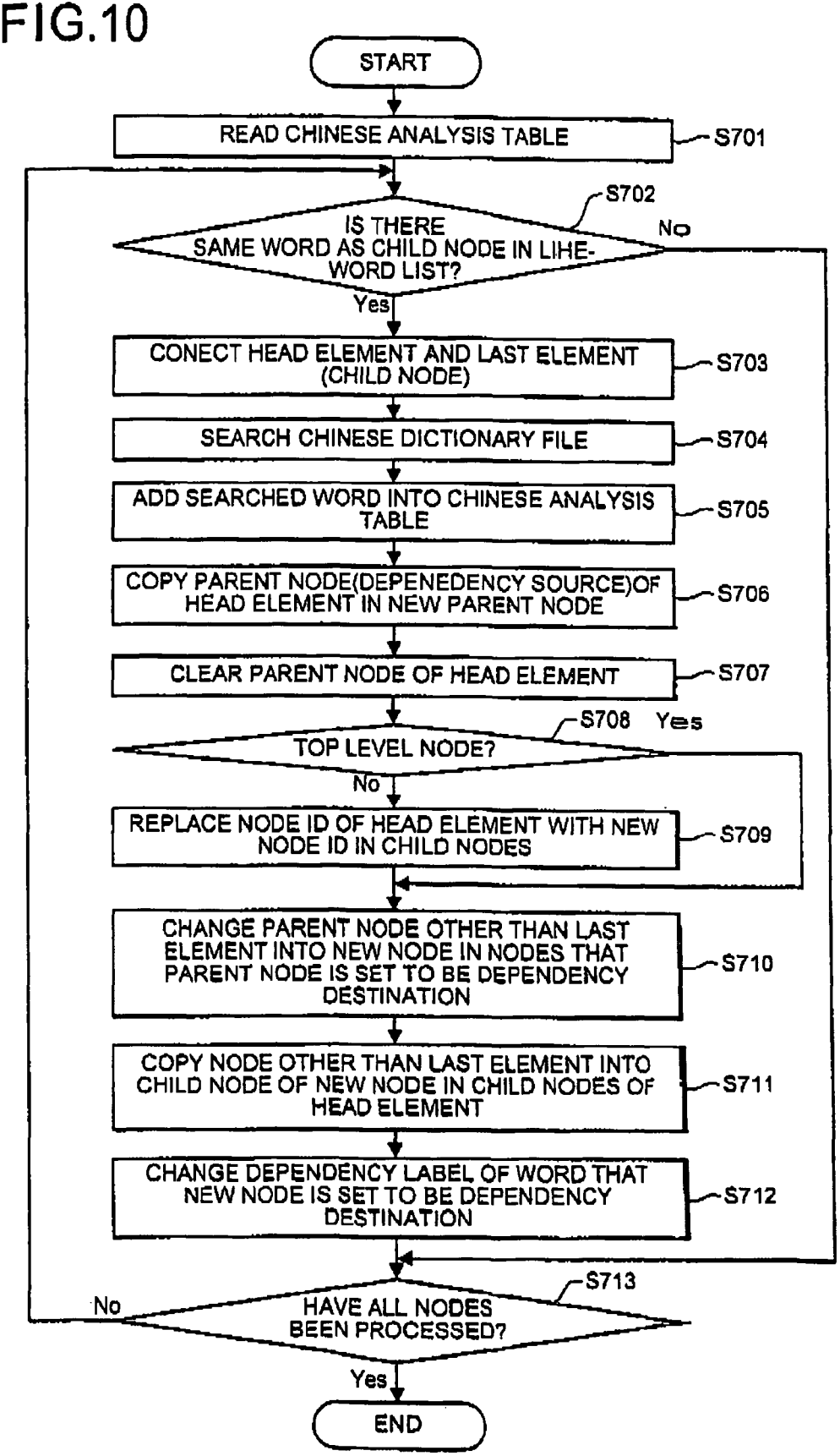
FIG. 10 is a flowchart of the lihe-word processing operation.

The lihe-word processing of step S205 is described in detail. FIG. 10 is a flowchart of the lihe-word processing to be performed by the lihe-word processor 105.

The lihe-word processor 105 first reads the Chinese analysis table 121 from the RAM 120 (step S701). The following processing is then performed on the words registered in the Chinese analysis table 121.

With the word to be processed being of a parent node, the lihe-word processor 105 determines whether the lihe-word list contains a word corresponding to the child node of be parent node word (step S702). If the lihe-word list contains a word corresponding to the child node, the lihe-word processor 105 determines that a lihe-word exists in the input Chinese sentence. In such a case, the word of the parent node (the word being processed currently) and the word corresponding to the child node are the head element and the last element respectively. Therefore, the lihe-word processor 105 combines the two words (step S703). With the combined words being a lihe-word, the lihe-word processor 105 searches the Chinese dictionary file 111 for the lihe-word (step S704). The lihe-word processor 105 then registers the lihe-word in the Chinese analysis table 121 (step S705).

With the lihe-word added to the Chinese analysis table 121, however, the dependency relationship in the Chinese sentence still remains the same as before the lihe-word registration. Therefore, it is necessary to make a change to the dependency relationship according to the added lihe-word, or to replace the parent node (the head element) and the child node (the last element) with the word of a new node (the lihe-word).

More specifically, the value of the "parent node" indicating the dependency destination of the head element word prior to the combining is copied in the "parent node" of the newly added lihe-word (step S706). The "parent node" of the word as the head element prior to the combining is then cleared (stop S707).

Figure 12:
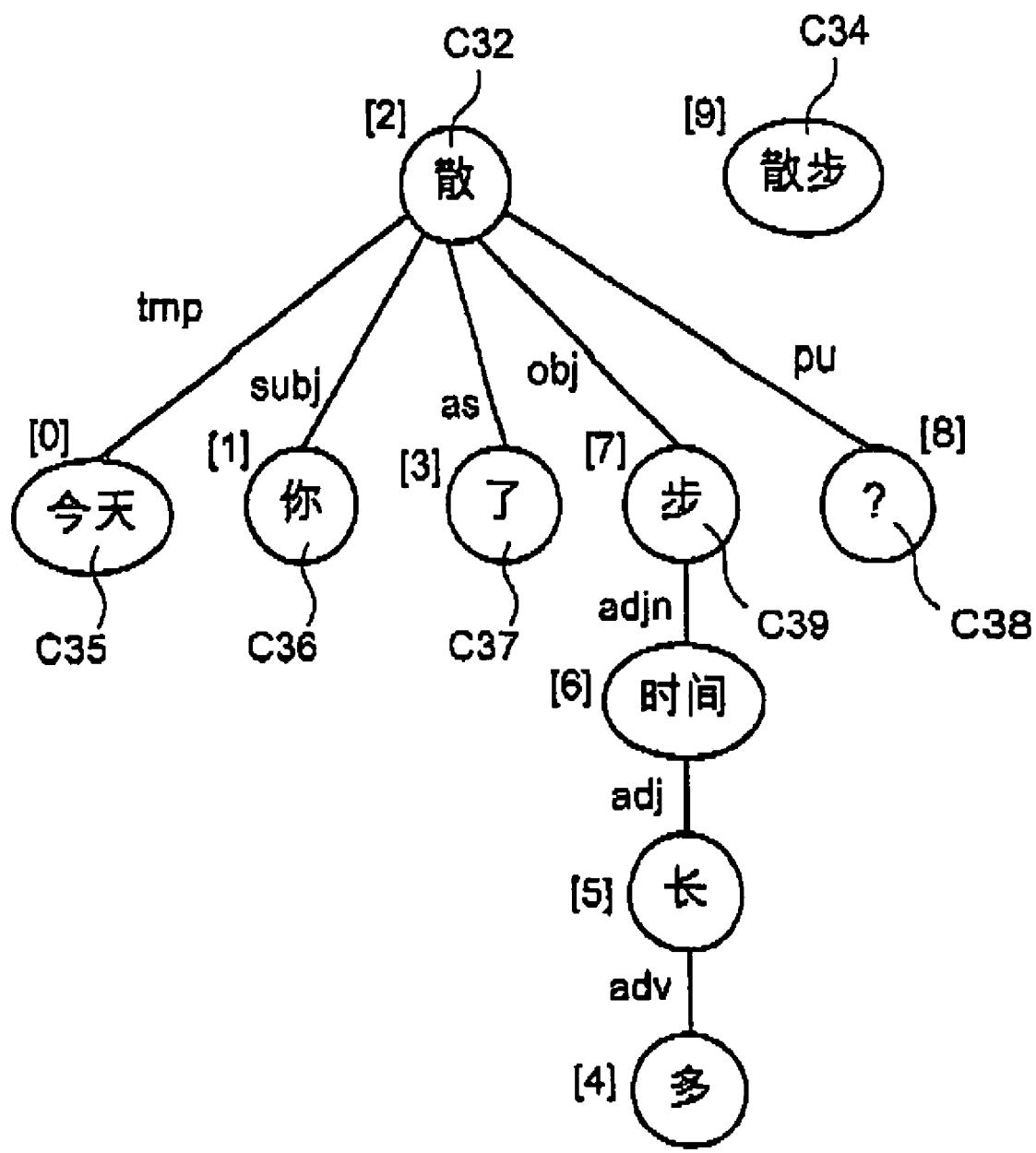
FIG. 12 is a tree structure representative of the dependency structure according to the Chinese analysis table of FIG. 11.

FIG. 11 is the state of the Chinese analysis table 121 immediately after the procedures up to step S707 are completed on the Chinese sentence C20 shown in FIG. 6. FIG. 12 is a tree structure representative of the dependency structure according to the Chinese analysis table 121 immediately after the procedures up to step S707 are completed. As shown in FIGS. 11 and 12, the lihe-word list of the word C32 with the node ID "2" contains a word corresponding to a word C33 with a node ID "7" as a child node. Accordingly, the word C32 is determined to form a lihe-word, and the word C32 as the head element and the word C33 as the last element are combined with each other. The Chinese dictionary file 111 is then searched for the word C16 shown in FIG. 5, and the word C16 as a new node is added as a word C34 with a node ID "9" to the Chinese analysis table 121. The "parent node" of the word C32 is then cleared (changed to "–"), and the parent node of the word C34 as the new node is changed to "–1", which is the parent node of the word C32 prior to the change.

The lihe-word processor 105 then determines whether the head element word as the parent node is of the top level node by checking whether the "parent node" of the newly added lihe-word is "–1" (or whether there is a dependency destination node) (step S708). If the "parent node" of the newly added lihe-word is not "–1", having a dependency destination node, and is not of the top level node ("No" at step S708), the node ID of the parent node word is replaced with the node ID of the newly added Lihe-word in the "child nodes" indicating the dependents of the parent node word (step S709). Meanwhile, if the "parent node" is "–1", not having a dependency destination node, and is of the top level node, the above replacing process is not carried out. In the Chinese sentence C20, the parent node word C32 is of the top level mode, and therefore, the replacing process is not carried out.

The value of the "parent node" of each word other than the word corresponding to the last element among the words having nodes each indicating that the parent node word is the dependency destination is changed to the value of the node of the newly added lihe-word (step S710). By doing so, the dependency destination of each word that depends on the head element word before the addition of the lihe-word is changed to the lihe-word.

The child nodes other than the node of the last element word that forms the lihe-word with the head element word among the nodes in the column of the "child node" of the head element word are copied into the column of the "child node" of the newly added lihe-word (step S711).

Figure 14:
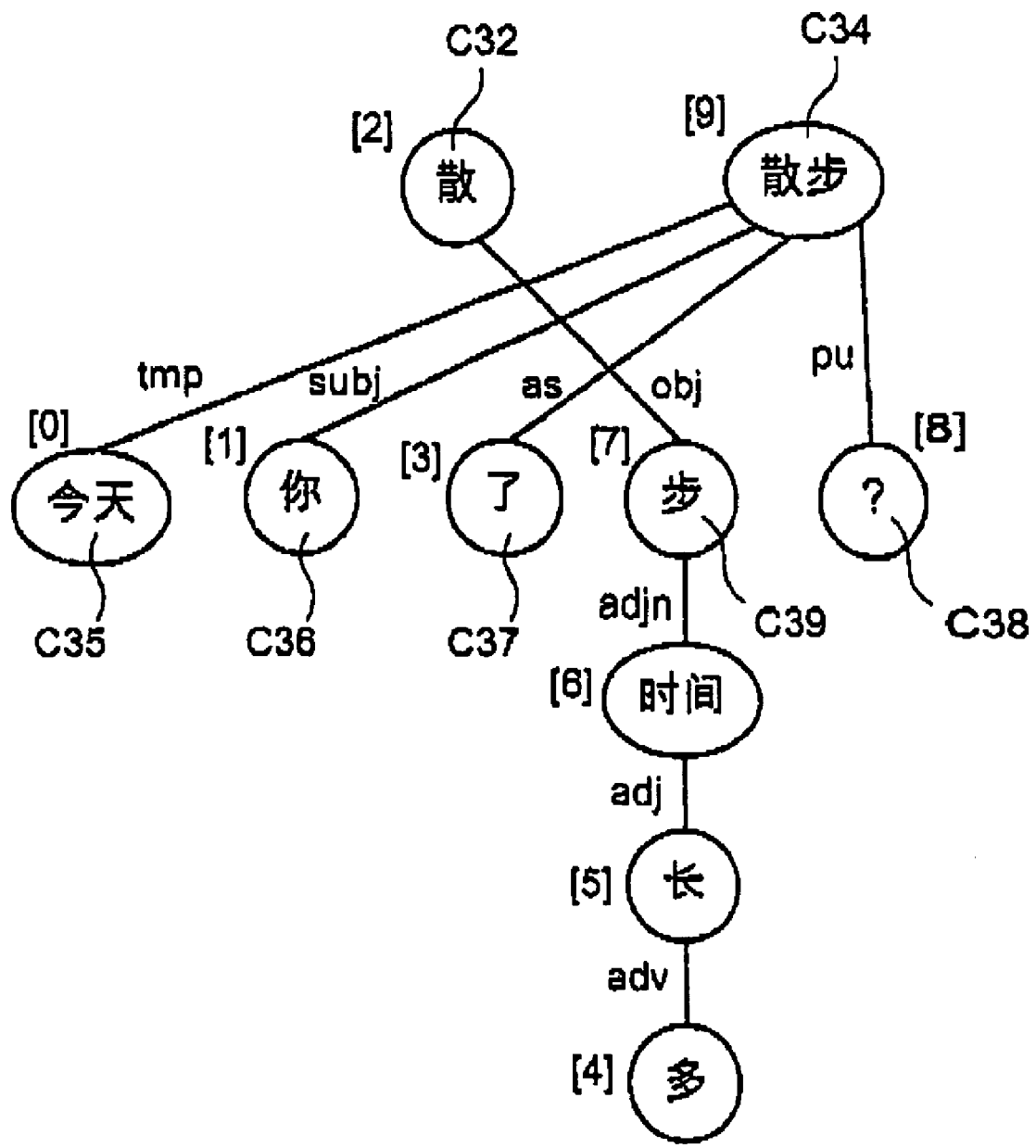
FIG. 14 is a tree structure representative of the dependency structure according to the Chinese analysis table of FIG. 13.

FIG. 13 is the state of the Chinese analysis table 121 immediately after the procedures up to step S711 are completed on the Chinese sentence C20 shown in FIG. 6. FIG. 14 is a tree structure that depicts the dependency structure according to the Chinese analysis table 121 immediately after the procedures up to step S711 are completed. As shown in FIGS. 13 and 14, the "parent node" of each of a word C35 with a node ID "0", a word C36 with a node ID "1", a word C37 with a node ID"3", and a symbol C38 with a node ID "8" is changed from "2" to "9", which is the node ID of the word C34 representative of the lihe-word as the new node (the changing procedure of step S710).

Also, the child nodes "0, 1, 3, 8", which do not include the node ID of a word C39 (the node ID "7") that forms the lihe-word with the word C32, among the child nodes "0, 1, 3, 7, 8" of the word C32, are copied into the column of "child node" of the word C34 as the new node (the changing procedure of step S711).

By making these changes, the dependency destination of each of the word C35 with the node ID "0", the word C36 With the node ID "1", the word C37 with the node ID "3", and the symbol C38 with the node ID "8" is changed to the word C34 representative of the lihe-word as the new node, as shown in FIG. 14.

The dependency label of each word depending on the lihe-word as the new node is changed from "pronominal modification (adjn)" to "predicate modification (adjv)" (step S712). The dependency label of each word that modifies the last element word, which is a noun, should be "pronominal modification", but the dependency label of each word that modifies the lihe-word, which is a verb, should be "predicate modification". By carrying out the procedures up to step S711, the dependency relationship is changed so that the words modifying the head element word, which is a noun, modify the lihe-word as the new node, which is a verb. Therefore, the dependency labels are changed at step S712, so that the dependency labels represent the proper dependency relationship.

Figure 16:
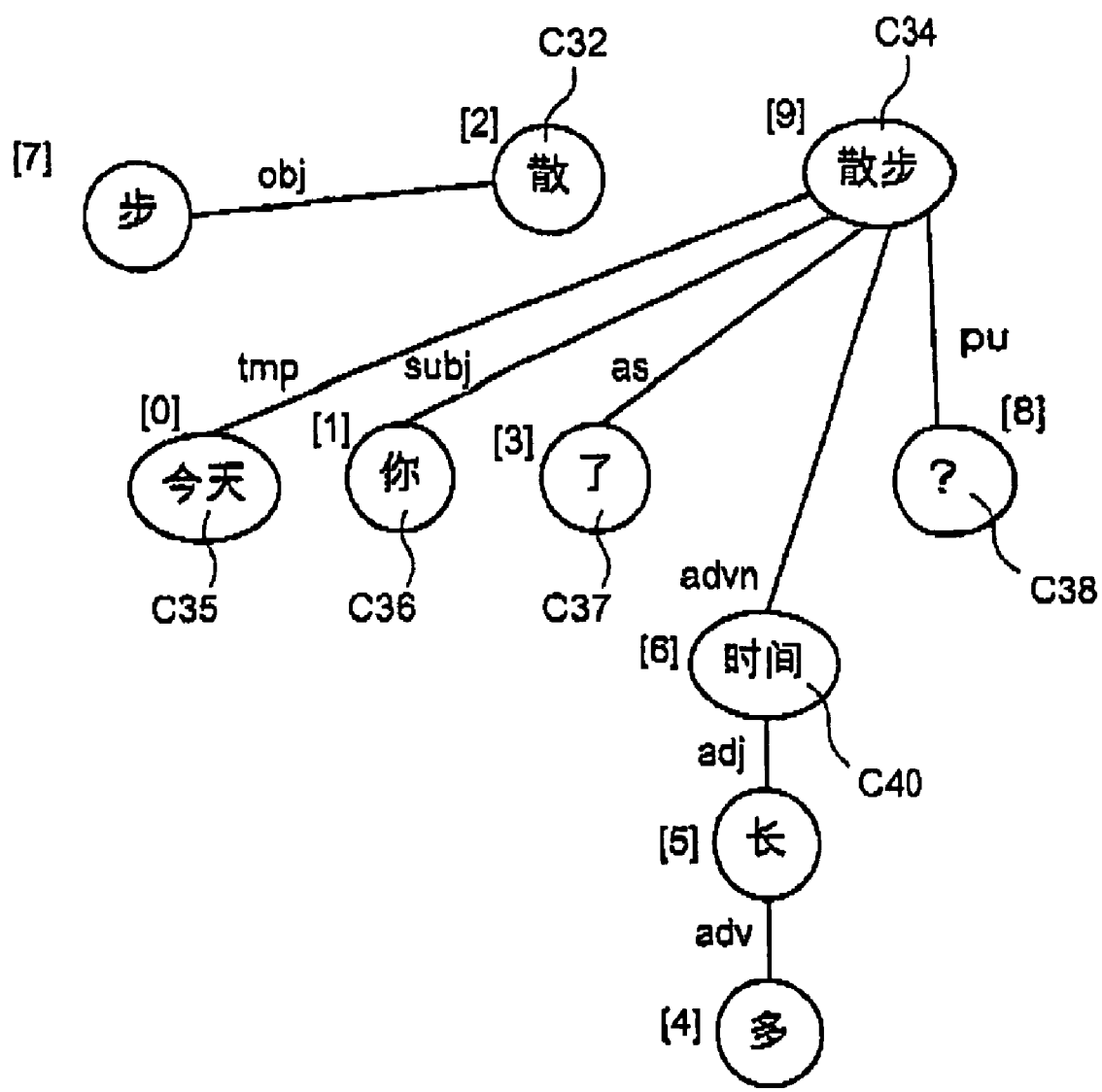
FIG. 16 is a tree structure representative of the dependency structure according to the Chinese analysis table of FIG. 15.

FIG. 15 is the state of the Chinese analysis table 121 immediately after the procedures up to step S712 are completed on the Chinese sentence C20 shown in FIG. 6. FIG. 16 is a tree structure representative of the dependency structure according to the Chinese analysis table 121 immediately after the procedures up to step S712 are completed. As shown in FIGS. 15 and 16, the dependency label of the "parent node" of a word C40 is changed from "adjn" to "advn", because the dependency destination of the word C40 that used to modify the word C39, which is the last element and a noun, is changed to the word C34, which is a lihe-word and a verb, through the procedures of steps S702 through S711.

The procedures of steps S702 through S712 are repeated for all the node IDs (stop S713). Thus, the node matching process that is required due to the addition of a lihe-word is completed, and the dependency relationship is properly changed.

In this manner, the Chinese-to-Japanese machine translation apparatus 100 of this embodiment analyzes each word obtained by dividing an input Chinese sentence, to determine the dependency destination and dependent(s) of each word. The head element and the last element that form a lihe-word are then detected. If the head element and the last element that form a lihe-word are detected, the lihe-word formed by combining the detected head element and last element is retrieved from the Chinese dictionary file 111. The dependency destination of each word that depends on either the head element or the last element is changed to the lihe-word. Therefore, it is not necessary to list the patterns of insertion words that can be inserted between the head element and the last element of a lihe-word during the process of analyzing a Chinese sentence containing a lihe-word. Accordingly the dependency structure of the Chinese sentence containing a lihe-word can be readily made clear. Thus, dependency structure analysis and Chinese-to-Japanese machine translation can be easily performed, with each lihe-word being comprehensively and accurately recognized.

In the Chinese-to-Japanese machine translation apparatus of this embodiment, the dependency structure analysis and the lihe-word processing are performed with the Chinese analysis table 121. However, each process may be carried out without such a table, while the dependency structure analyzer 104 or the lihe-word processor 105 holds a dependency structure pattern, for example.

In the Chinese-to-Japanese machine translation apparatus of this embodiment, the dependency label is changed from "pronominal modification" to "predicate modification". However, it is possible to change the dependency label to some other modification label, depending on the type of the lihe-word being processed.

In this embodiment, the Chinese language analyzing apparatus according to the present invention, the Chinese language analyzing method according to the present invention, and the computer program product that uses the Chinese language analyzing method are applied to the Chinese-to-Japanese machine translation apparatus, the Chinese-to-Japanese machine translation method, and the Chinese-to-Japanese machine translation program. However, this embodiment may be applied to machine translation from Chinese into other languages. For example, the Chinese language analyzing apparatus according to the present invention, the Chinese language analyzing method according to the present invention, and the computer program product that uses the Chinese language analyzing method may be applied to a Chinese-to-English machine translation apparatus that translates Chinese into English, a Chinese-to-English machine translation method, and a Chinese-to-English machine translation program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for analyzing Chinese language, comprising:
    an input unit inputting a Chinese sentence;
    a morpheme analyzer dividing the Chinese sentence into words;
    a dependency relationship analyzer analyzing a dependency relationship between a parent word being a dependency destination of each of the words and a child word being a dependent from each of the words, the words being obtained by dividing the input Chinese sentence;
    a memory unit that stores lihe-word information that registers a first word being a Chinese morpheme and capable of being a part of a lihe-word with a plurality of second words each forming a lihe-word with the first word, does not include words inserted between the first word and the second word, and lihe-words formed by the first word and the second words in the lihe-word information are not grouped based on similarity with other lihe-words;
    a lihe-word processor detecting the first word and a second word from the dependency relationship, based on the lihe-word information without using the similarity of the lihe-word with other lihe-words, and the lihe-word processor changing a dependency destination of a word depending on both the first word and the second word to the lihe-word formed by combining the first word with the second word in the dependency relationship;
    a generating unit generating a sentence based on the lihe-word formed by combining the first word with the second word and the word depending on the lihe-word by changing the dependency destination; and
    an output unit outputting the sentence.

2. The apparatus according to claim 1, wherein:
    the memory unit further stores dependency analysis information in which the parent word is associated with the child word;
    the dependency relationship analyzer registers the parent word and the child word of each divided word in the dependency analysis information; and
    the lihe-word processor detects the first word and the second word from the dependency relationship based on the lihe-word information, and changes the dependency destination of the word depending on both the first word and the second word to the lihe-word in the dependency analysis information.

3. The apparatus according to claim 2,
    wherein the memory unit further stores Chinese dictionary information in which a word being a morpheme of Chinese sentences, a part of speech of the word, and the lihe-word information are associated with each other,
    the dependency analysis information includes the word and the part of speech associated with the word, and
    the lihe-word processor detects, based on the lihe-word information, the first word and the second word from the words analyzed, retrieves the Chinese dictionary information for the lihe-word formed by combining the first word and the second word, registers the lihe-word retrieved and the part of speech thereof in the dependency analysis information, and changes the dependency destination of the word depending on both the first word and the second word to the lihe-word in the dependency analysis information.

4. The apparatus according to claim 3,
    wherein the dependency analysis information includes modification information associated with the word, the modification information indicating a type of modification for the parent word, and
    the lihe-word processor, when changing the dependency destination of the word depending on both the first word and the second word to the lihe-word, changes the modification information of the word based on the part of speech of the lihe-word.

5. The apparatus according to claim 4, wherein the lihe-word processor, when changing the dependency destination of a word having a pronominal modifier as the modification information to the lihe-word, changes the modification information to a predicate modifier.

6. The apparatus according to claim 3, wherein the generator unit comprises a meaning analyzer generating the sentence by analyzing a meaning and contents of the Chinese sentence, using the Chinese dictionary information and the dependency analysis information.

7. The apparatus according to claim 6, wherein the generator unit comprises a translator generating the sentence by translating the dependency relationship of the Chinese sentence into a dependency relationship of an equivalent sentence in a language other than Chinese.

8. The apparatus according to claim 7, wherein the language other than Chinese is English.

9. The apparatus according to claim 7, wherein the generator unit comprises a translated sentence generator generating an equivalent sentence in the language other than Chinese, based on the dependency relationship of the equivalent sentence translated by the translator.

10. The apparatus according to claim 9, wherein the language other than Chinese is English.

11. The apparatus according to claim 9, further comprising a display unit displaying the equivalent sentence generated by the translated sentence generator.

12. The apparatus according to claim 9, wherein the output unit comprises a printer printing the equivalent sentence generated by the translated sentence generator.

13. The apparatus of claim 1, further comprising:
a syntax analyzer that includes the dependency relationship analyzer and the lihe-word processor.

14. A method of analyzing Chinese language implemented by a computer processor executing instructions, comprising:
inputting, by a computer receiving input from a user interface, a Chinese sentence;
dividing, by the computer, the sentence into words;
analyzing, by the computer, a dependency relationship between a parent word being a dependency destination of each of the words and a child word being a dependent from each of the words;
detecting, by the computer, a first word being a Chinese morpheme and capable of being a part of a lihe-word and a second word forming the lihe-word with the first word, from the dependency relationship, based on a lihe-word information in a memory unit, without using the similarity of the lihe-word with other lihe-words, wherein the lihe-word information registers the first word with a plurality of second words each forming a lihe-word with the first word, but does not include words inserted between the first word and the second word, and the lihe-word formed by the first word and the second words in the lihe-word information not being grouped based on similarity with other lihe-words;
changing, by the computer, a dependency destination of a word depending on both the first word and the second word to the lihe-word formed by combining the first word with the second word in the dependency relationship;
generating, by the computer, a sentence based on the lihe-word formed by combining the first word with the second word and the word depending on the lihe-word by changing the dependency destination; and
outputting the sentence.

15. A computer program product having a non-transitory computer readable medium including programmed instructions, wherein the instructions, when executed by a computer, cause the computer to perform a method which comprises:
inputting a Chinese sentence;
dividing the sentence into words;
analyzing a dependency relationship between a parent word being a dependency destination of each of the words and a child word being a dependent from each of the words;
detecting, by the computer, a first word being a Chinese morpheme and capable of being a part of a lihe-word and a second word forming the lihe-word with the first word, from the dependency relationship, based on a lihe-word information in a memory unit without using the similarity of the lihe-word with other lihe-words, wherein the lihe-word information registers the first word with a plurality of second words each forming a lihe-word with the first word, but does not include words inserted between the first word and the second word, and the lihe-word formed by the first word and a second word in the lihe-word information being not grouped based on similarity with other lihe-words;
changing a dependency destination of a word depending on both the first word and the second word to the lihe-word formed by combining the first word with the second word in the dependency relationship;
generating a sentence based on the lihe-word formed by combining the first word with the second word and the word depending on the lihe-word by changing the dependency destination; and
outputting the sentence.

16. The computer program product of claim 15, the method further comprising:
combining the first word with the second word in the dependency relationship to form the lihe-word.

* * * * *